United States Patent
Dai et al.

(10) Patent No.: US 10,713,305 B1
(45) Date of Patent: Jul. 14, 2020

(54) METHOD AND SYSTEM FOR DOCUMENT SEARCH IN STRUCTURED DOCUMENT REPOSITORIES

(71) Applicant: EMC IP Holding Company LLC, Hopkinton, MA (US)

(72) Inventors: Hongtao Dai, Shanghai (CN); Lei Zhang, Shanghai (CN); Chao Chen, Shanghai (CN); Kunwu Huang, Shanghai (CN); Jingjing Liu, Shanghai (CN); Ying Teng, Pleasanton, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 270 days.

(21) Appl. No.: 15/279,892

(22) Filed: Sep. 29, 2016

(51) Int. Cl.
*G06F 16/93* (2019.01)
*G06F 16/13* (2019.01)
*G06F 16/22* (2019.01)

(52) U.S. Cl.
CPC .............. *G06F 16/93* (2019.01); *G06F 16/13* (2019.01); *G06F 16/22* (2019.01)

(58) Field of Classification Search
None
See application file for complete search history.

(56) References Cited

U.S. PATENT DOCUMENTS

| | | | | |
|---|---|---|---|---|
| 6,269,380 | B1 * | 7/2001 | Terry | G06F 17/30011 |
| 6,356,891 | B1 * | 3/2002 | Agrawal | G06F 17/30336 |
| 7,664,806 | B1 * | 2/2010 | Koudas | G06F 17/30545 |
| | | | | 707/899 |
| 7,822,751 | B2 * | 10/2010 | O'Clair | G06F 16/9537 |
| | | | | 707/748 |
| 8,635,228 | B2 * | 1/2014 | Shahabi | G06F 17/30722 |
| | | | | 707/741 |
| 8,762,225 | B1 * | 6/2014 | Dean | G06F 16/93 |
| | | | | 705/26.64 |
| 2010/0042963 | A1 * | 2/2010 | Bruno | G06F 17/30312 |
| | | | | 716/122 |
| 2010/0094877 | A1 * | 4/2010 | Garbe | G06F 17/301 |
| | | | | 707/742 |
| 2010/0185666 | A1 * | 7/2010 | Crow | G06F 17/212 |
| | | | | 707/770 |
| 2011/0072023 | A1 * | 3/2011 | Lu | G06F 16/353 |
| | | | | 707/741 |
| 2011/0202541 | A1 * | 8/2011 | Permandla | G06F 17/30613 |
| | | | | 707/742 |
| 2011/0252064 | A1 * | 10/2011 | Murugappan | G06F 16/487 |
| | | | | 707/780 |
| 2012/0110015 | A1 * | 5/2012 | Nath | G06F 17/30693 |
| | | | | 707/780 |
| 2012/0166443 | A1 * | 6/2012 | Bloesch | G06F 17/30595 |
| | | | | 707/740 |

(Continued)

*Primary Examiner* — Christopher J Raab
(74) *Attorney, Agent, or Firm* — Chamberlain, Hrdlicka, White, Williams & Aughtry (57) ABSTRACT

A method for document search in a structured document repository. The method includes obtaining a document search query from a client, obtaining location constraints for documents to be identified in a structured document repository based on the document search query, identifying, in a document search index associated with the structured document repository, a document that matches the search query and the location constraints, and providing information associated with the identified document to the client.

20 Claims, 5 Drawing Sheets

(56) References Cited

U.S. PATENT DOCUMENTS

| | | | |
|---|---|---|---|
| 2012/0296913 A1* | 11/2012 | Ash | G06F 17/30619 |
| | | | 707/741 |
| 2013/0046785 A1* | 2/2013 | Assadollahi | G06F 17/30011 |
| | | | 707/776 |
| 2013/0110892 A1* | 5/2013 | Wood | G06F 17/30165 |
| | | | 707/827 |
| 2013/0226959 A1* | 8/2013 | Dittrich | G06F 17/30312 |
| | | | 707/769 |
| 2014/0229468 A1* | 8/2014 | Or | G06F 16/29 |
| | | | 707/724 |

* cited by examiner

METHOD AND SYSTEM FOR DOCUMENT SEARCH IN STRUCTURED DOCUMENT REPOSITORIES

BACKGROUND

A significant amount of content is stored in document repositories. Frequently, documents repositories are structured, e.g., using hierarchically organized folders. A document search query may require the identification of documents based on their locations in a structured document repository.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description.

In the following description of FIGS. 1-5, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment, which may be implemented in addition to, in conjunction with, or in place of the embodiments described with regard to a corresponding like-named component in any other figure.

In general, embodiments of the technology relate to a method and system for document searches in structured document repositories. Documents, in one or more embodiments of the technology, are stored in a document repository that is structured by, e.g., including identifiable locations in the document repository. The structure of the repository may be provided by a file system with folders, a database that stores documents in different locations, or any other form of organization that enables the storage of documents in different locations. In one or more embodiments of the technology, a search for a document may include location constraints. In other words, a user may request to receive only matching documents that are stored at a particular location in the structured document repository. For example, the user may request to receive documents that match the search query only if these documents are stored in folders A, B, and C, but not in any other folder of the structured document repository.

Figure 1:
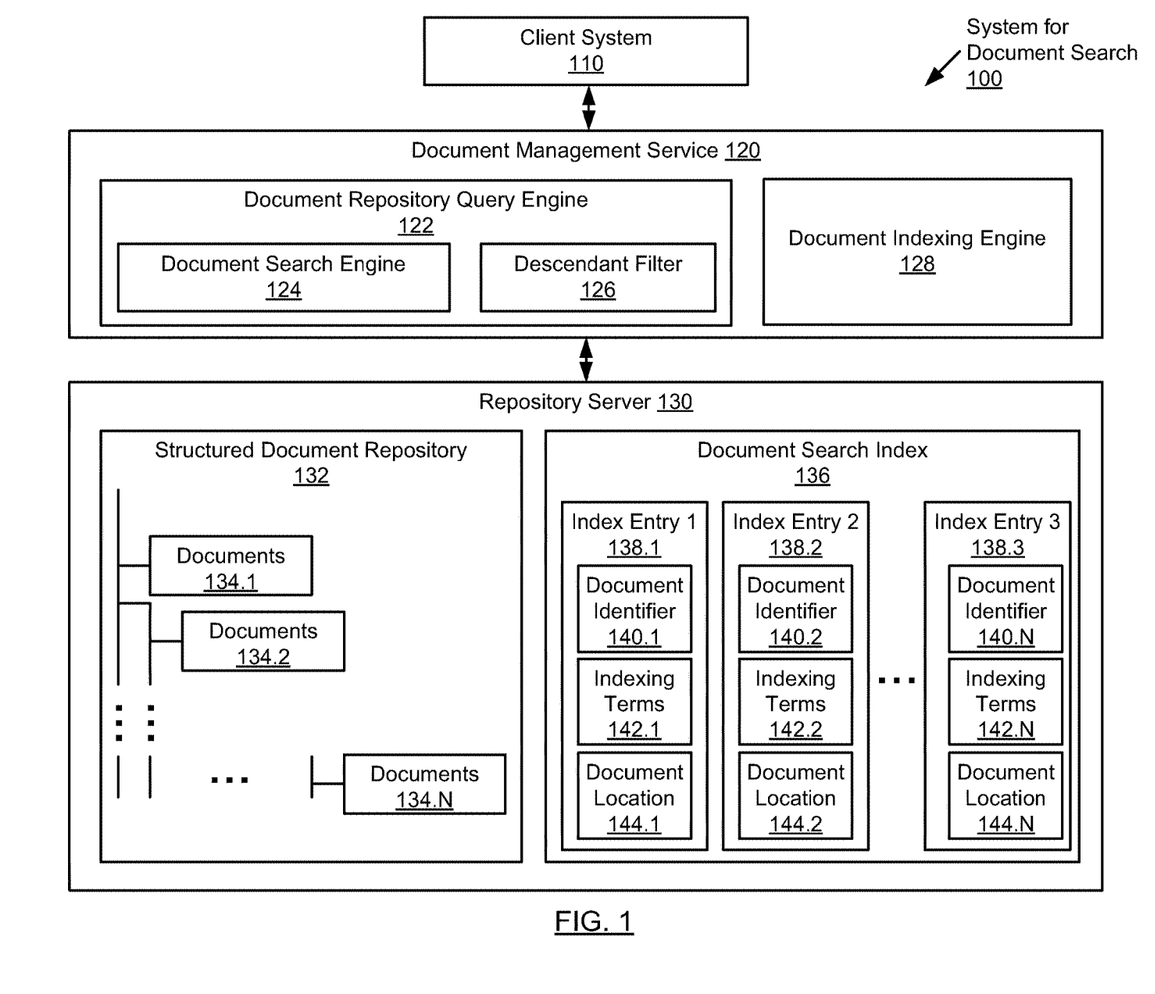
FIG. 1 shows an exemplary system for document search, in accordance with one or more embodiments of the technology.

FIG. 1 shows an exemplary system for document search, in accordance with one or more embodiments of the technology. The system includes a client system (110) (or multiple client systems), a document management service (120), and a repository server (130). The aforementioned components may communicate with each other using any known or later discovered communication protocol. Further, the aforementioned components may communicate using any combination of wired and/or wireless connections and wired and/or wireless networks. Each of the aforementioned components is described below.

In one embodiment of the technology, a client system (110) corresponds to any computing system (see e.g., FIG. 5) that includes functionality to issue document search requests (also referred to as queries) to the document management service (120) and to receive a corresponding response(s) from the document management service after the request has been serviced.

Figure 2:
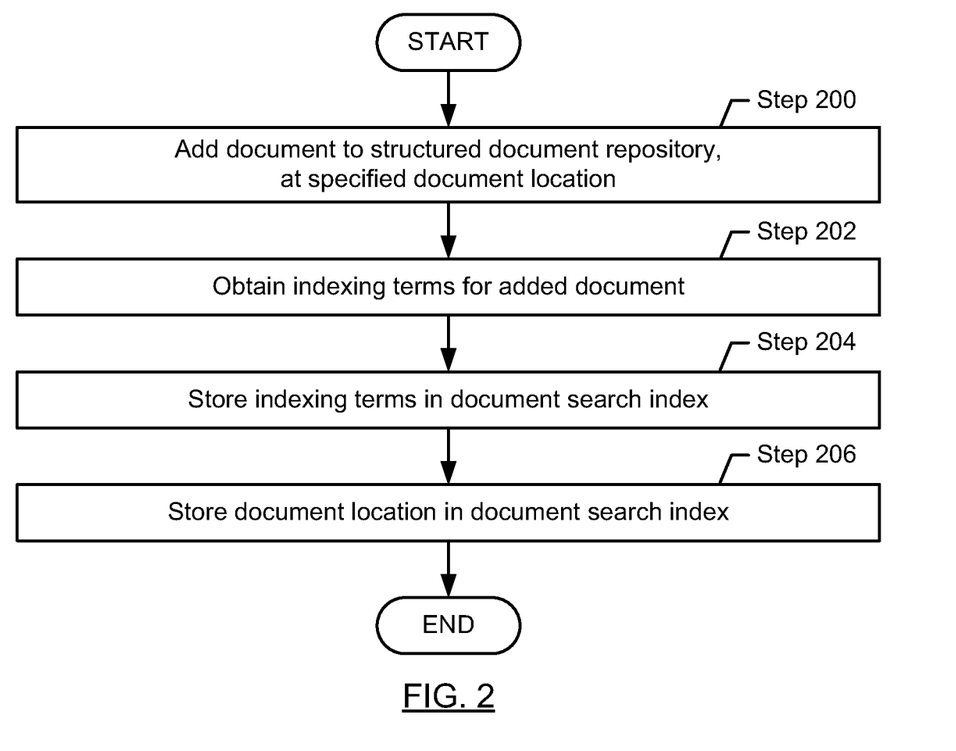
FIG. 2 shows a method for archiving a document in a structured document repository, in accordance with one or more embodiments of the technology.
Figure 3:
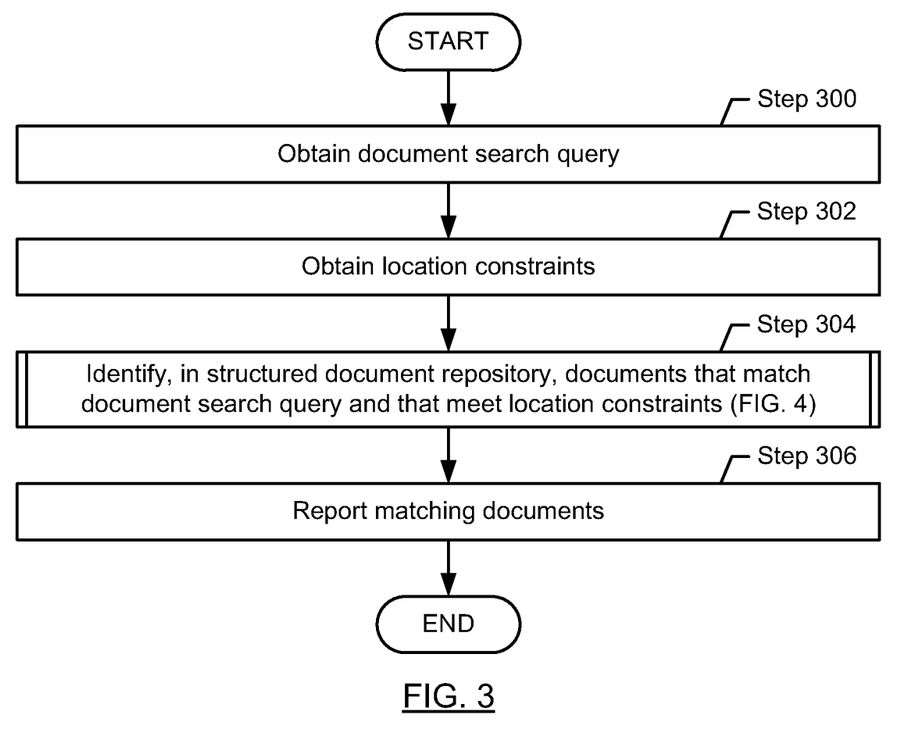
FIG. 3 shows a method for performing a search for documents in the structured document repository, in accordance with one or more embodiments of the technology.
Figure 4:
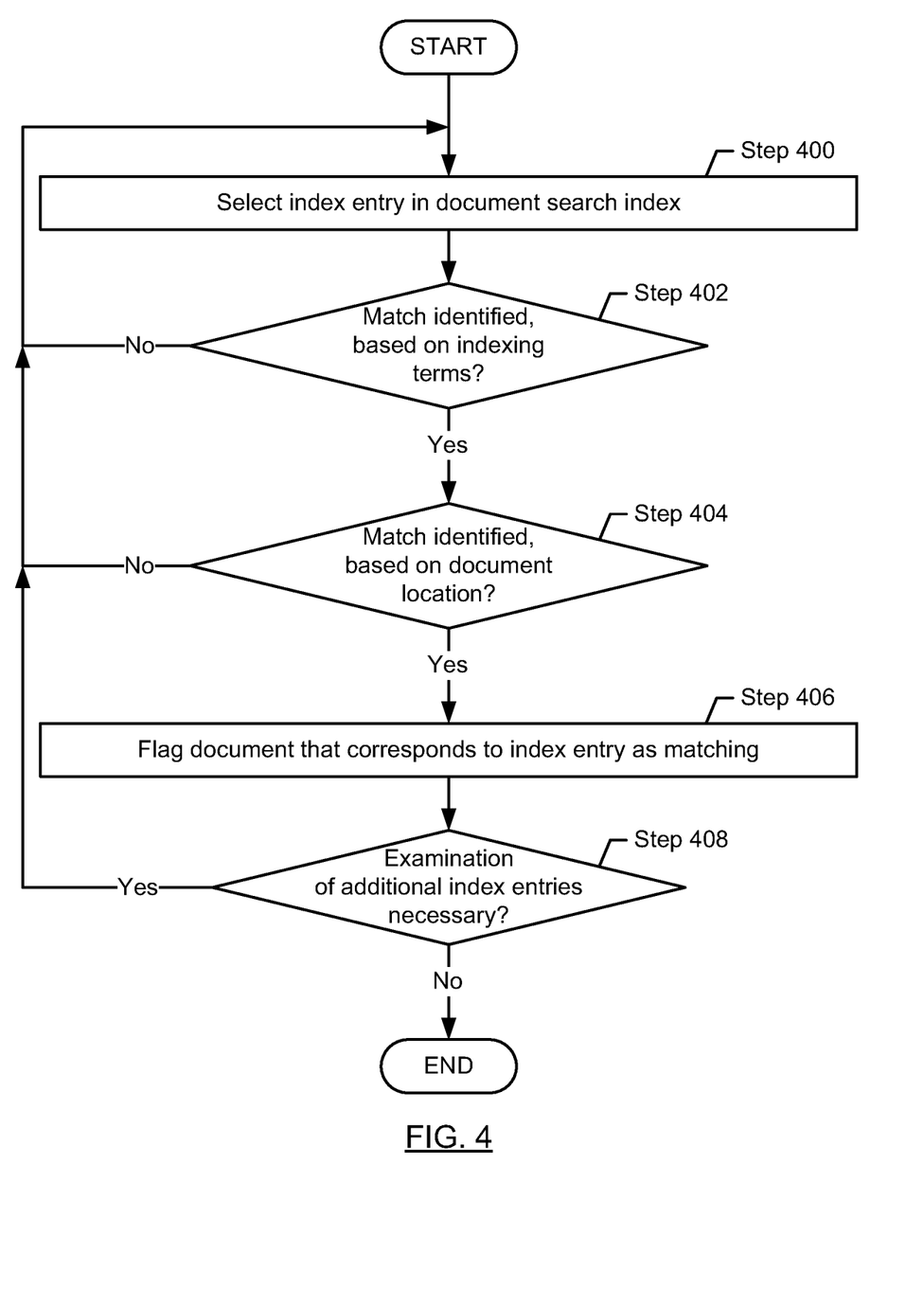
FIG. 4 shows a method for locating a document in the structured document repository, based on a document search query and folder constraints, in accordance with one or more embodiments of the technology.

Continuing with the discussion of FIG. 1, the document management service (120) includes functionality to perform all or a portion of the methods shown in FIGS. 2-4. The document management service may also include functionality to perform various actions (e.g., read, write, delete, modify, send, etc.) on the objects stored in the structured document repository (132) and/or the document search index (136), when servicing requests from the client system and/or requests issued by another party, e.g., an administrator. The document management service may be implemented using one or more computing systems (see e.g., FIG. 5).

The document management service, in accordance with one or more embodiments of the technology, includes a document repository query engine (122), and a document indexing engine (128).

The document repository query engine (122) includes a document search engine (124) and a descendant filter (126). The document search engine (124), in accordance with one or more embodiments of the technology, identifies documents, in the structured document repository (132), that match a user-specified search query. The document search engine (124) may further perform additional functions such as determining whether the requesting user is authorized to access the identified documents. The search being performed by the document search engine (124), in one or more embodiments of the technology, is an indexed document search. Accordingly, the document search engine (124) may access the document search index (136) when performing a search for documents in the structured document repository (132).

The descendant filter (126), in accordance with one or more embodiments of the technology, determines, for each document identified by the document search engine, whether the document meets previously specified document location constraints. More specifically, as the document search engine (124) identifies a document, the descendant filter determines, based on a comparison of the document location, specified in the document search index, and the location constraints, whether the document should be reported to the requesting user. A description of the document search, performed by the document search engine (124), and of the document filtering, performed by the descendant filter (126) is provided below with reference to FIGS. 3 and 4.

The document indexing engine (128), in accordance with one or more embodiments of the technology, indexes documents (134.1-134.N) that are stored in the structured document repository (132). The document indexing engine (128) generates document search index entries that include at least a document identifier (138), indexing terms (140) and a document location (142). One document search index entry may be generated per indexed document, and some or all documents (134) in the structured document repository (132) may be indexed by the document indexing engine. Each of the index entries, in accordance with an embodiment of the technology, includes information that characterizes a document in the structured document repository. The generation and use of document identifiers (138), indexing terms (140) and document locations (142) is further described below.

Continuing with the discussion of FIG. 1, the repository server (130), includes functionality to store documents in the structured document repository (132) and to store document indexing information in the document search index (136). The structured document repository (132) and the document search index (136) may be hosted on any type of non-volatile (or persistent) storage, including, for example, a hard disk drive, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM), a redundant array of independent disks (RAID), network attached storage (NAS), cloud storage, etc. Further, at least some of the content in the repositories (132, 134) may alternatively or in addition be stored in volatile memory, e.g., Dynamic Random-Access Memory (DRAM), Synchronous DRAM, SDR SDRAM, and DDR SDRAM.

The structured document repository (132) and/or the document search index (136) may be implemented using any format suitable for the storage of the corresponding entries in these repositories. One or more of these repositories may be, for example, a collection of text or binary files, spreadsheets, SQL databases etc., or any other type of hierarchical, relational and/or object oriented collection of data.

The structured document repository (132), in accordance with an embodiment of the technology, hosts a collection of documents (134.1-134.N) that may be searched upon request, e.g., by a user. The documents in the structured document repository may include any type of content and may be text documents encoded in various formats, or hybrid documents including text content in combination with other, non-text content.

In one embodiment of the technology, the structured document repository (132) is a file system, and a document (134) may be stored as a file in the file system in a folder or directory. The file system may be hierarchical and may include any number of hierarchies. Alternatively, the structured document repository (132) may be any other form of structured storage, e.g., a database of any type, or a file in which different locations are distinguishable. In one or more embodiments of the technology, the documents (134) in the structured document repository (132) are indexed to facilitate and/or accelerate the search for documents. The resulting indexing data may be stored in the document search index (136), as subsequently described.

The document search index (136), in accordance with one or more embodiments of the technology, includes the indexing information for at least some of the documents (134.1-134.N) in the structured document repository (132). The indexing information for a document (134), in accordance with an embodiment of the technology, is stored in an index entry (138). The document search index (136) may be a file system, a file, or any kind of database that accommodates the index entries (128.1-138.N).

Each index entry (138) corresponds to a single document (134) in the structured document repository (132) and characterizes the document. Index entries may exist for at least some of the documents in the structured document repository. The generation of index entries is described below, with reference to FIG. 2.

An index entry (138) in accordance with an embodiment of the technology, includes a document identifier (140), indexing terms (142) and a document location (144). The document identifier (140), in accordance with an embodiment of the technology, is used to associate the index entry (138), including the subsequently described indexing terms (142) and the document location (144) with the corresponding document (134) in the structured document repository (132). The document identifier (140) may be any type of identifier based on which a corresponding document (134) in the structured document repository (132) can be identified. The document identifier may be, for example, the name of the corresponding document.

The indexing terms (142) in accordance with an embodiment of the technology, are expressions, e.g., words or phrases that characterize the corresponding document, obtained from a corresponding document (134) when indexing the document, as further described in FIG. 2. The indexing terms may be stored in any format, for example as text. The indexing terms may further be accompanied by counts that provide a cardinality for each indexing term, based on the number of instances of the indexing term found in the corresponding document.

A document location (144), in accordance with one or more embodiments of the technology, describes where the corresponding document (134) is located in the structured document repository. The document location may thus specify, e.g., a path, a folder, a directory, a database location, or any other location where the corresponding document is located.

With the document location (144) of an index entry (138) being directly stored in the document search index (136), the location of the document (134) in the structured document repository (132) can be obtained directly by reading the index entry (138) in the document search index (136). At least part of the document search index is thus implemented as a covering index, which in contrast to a conventional index that merely points to a location from where an information can be obtained, contains the actual information itself.

The technology is not limited to the architecture of the system (100) shown in FIG. 1. Specifically, although FIG. 1 shows a single repository server (130), a single structured document repository (132) and a single document search index (136), those skilled in the art will appreciate that one or more of these elements may be distributed over multiple repositories, and that the repositories may be local and/or remote. Further, the system (100) may include any number of client systems (110).

FIGS. 2-4 show flowcharts in accordance with one or more embodiments of the technology. While the various steps in the flowcharts are presented and described sequentially, one of ordinary skill will appreciate that some or all of these steps may be executed in different orders, may be combined or omitted, and some or all of the steps may be executed in parallel. While FIG. 2 describes how a newly received document may be archived, FIGS. 3 and 4 describe how a document search in the structured document repository may be performed, e.g., in response to a user having submitted a search query. The method of FIG. 2 may be executed independently from the methods of FIGS. 3 and 4. More specifically, a document may be added to the structured document repository at any time, while a search for a document may also occur at any time.

FIG. 2 shows a method for archiving a document in a structured document repository, in accordance with one or more embodiments of the technology. The method may be executed whenever a new document is stored in the structured document repository. The method as described may be performed for each document in the structured document repository in order to obtain a complete document search index that represents all documents in the structured document repository.

Turning to FIG. 2, in Step 200, a document is added to the structured document repository, e.g., by a user storing a document via the client system. The added document may be stored in the structured document repository. In one embodiment of the technology, the structured document repository includes different locations in which documents may be stored. The structured document repository may, for example, include different folders or directories that may be hierarchically organized. The document is stored in a location that is either specified by the user or by a configuration of the document management service. Alternatively, a document may be stored in a particular location based on document characteristics including, but not limited to, a document name, a document date, a document size and/or a document characterization.

In Step 202, indexing terms are obtained for the document that was added to the structured document repository. Indexing terms may be obtained by parsing the document and by identifying the most frequently occurring terms. Identifying indexing terms may require additional steps such as, for example, the removal of stop words from the document content. Stop words may be frequently occurring words such as, for example "the", "a" "to", etc. that may not serve as meaningful keywords for representing the document content in a document content identifier. Further, the document content may be stemmed, i.e., words or terms in the document may be replaced by the corresponding word stems. For example, the words "fishing", fished" and "fisher" may be reduced to the root word fish. Alternatively, lemmatization may be used to obtain the word stems.

Frequently occurring terms in the document may be considered indexing terms which may be obtained, for example, by generating a sorted list of the word stems. The list may only include terms that occur with at least a certain frequency.

In Step 204, the indexing terms are stored in the document search index.

The indexing terms may be stored in an index entry that is specific to the document from which the indexing terms were obtained, and that is uniquely identified using a document identifier. The indexing terms may be accompanied by other information such as, for example, a cardinality determined for each of the indexing terms. The cardinality may be based on how frequently the indexing term exists in the document.

In Step 206, the location in which the document was stored in Step 200 is stored in the document search index, as part of the index entry that corresponds to the document. Depending on the organization of the structured document repository, a particular format may be used for the document location. For example, the document location may be a path that includes folders or directories, or any other location specifier that allows identification of the location in the structured document repository, where the document can be found.

FIG. 3 shows a method for performing a search for documents in the structured document repository, in accordance with one or more embodiments of the technology. The method of FIG. 3 may execute at any time, for example, when a user or another software module request a document search.

Turning to FIG. 3, in Step 300, a document search query is obtained, e.g., from a requesting user or from a requesting software module. The search query may be submitted in any form that enables the system for document search to identify, in the structured document repository, documents that match the search query. The search query, in accordance with an embodiment of the technology, includes search terms (e.g., individual words, sentences, paragraphs, etc.) that are to be located in the documents that are stored in the document repository.

In Step 302, location constraints are obtained. The location constraints may be obtained, for example from the requesting user or from the requesting software module. The location constraint may be a path, a folder, a directory, or any other location, without departing from the technology. Further, the location constraint may be groups of locations to be considered or to be excluded by the search to be performed. For example, a location constraint may specify that a folder and any folders that are hierarchically organized below that folder are to be considered.

In Step 304, documents that match the document search query and that meet the location constraints are identified in the structured document repository, as further described in FIG. 4.

In Step 306, the documents identified in Step 304, are reported to the requesting user or to the requesting software module.

FIG. 4 shows a method for locating a document in the structured document repository, based on a document search query and location constraints.

Turning to FIG. 4, in Step 400, an index entry is selected from the index entries in the document search index. Any index entry may be selected.

In Step 402, a determination is made about whether the selected index entry corresponds to a matching document, based on the indexing terms in the index entry. The determination may be made by a comparison of the search terms specified in the search query and the indexing terms in the index entry. If a sufficient match is found (e.g., based on at least a specified number of search terms being found among the indexing terms), a determination is made that a match has been identified, and the method may proceed to Step 404. If a match has not been identified, the method may return to Step 400 to identify a different index entry.

In Step 404, a determination is made about whether the selected index entry corresponds to a matching document, based on the document location. The determination may be made by verifying that the document location, stored in the index entry, does not violate the location constraints. If a match is found, the method may proceed to Step 406, where the document that corresponds to the index entry is flagged as a matching document, i.e., as a document for which both the search term requirement and the location constraints are met. If no match was found, the method may return to Step 400 to identify a different index entry.

In Step 408, a determination is made about whether additional index entries need to be considered. This may be necessary, for example, if the search is to be performed across all index entries, while not all index entries have yet been examined. Alternatively, additional index entries may need to be considered if the search query specifies a certain number of matching documents to be returned, while the number of identified matching documents is still below this number. If a determination is made that additional index entries are to be considered, the method may return to Step 400.

Embodiments of the technology may enable a system to perform indexed searches for documents while explicitly considering the storage location of the documents in a structured document repository. Embodiments of the technology are based on a search index that is organized in the form of a covering index. The search index includes a documentation of the locations of the documents in the structured document repository. The search for documents is performed in an effective manner using a single-step search approach in which, for each document that matches a search query, a confirmation can be obtained regarding whether the document is to be reported based on the document's location in the structured document repository. A document is assessed, Both the indexing terms and the document location are obtained directly from the document search index. Embodiments of the technology thus avoid input/output operation-intense verification of the document location by scanning the structured document repository for the document's location. Embodiments of the technology, by reducing the number of file system operations, thus increase search performance and/or reduce computing system load.

Figure 5:
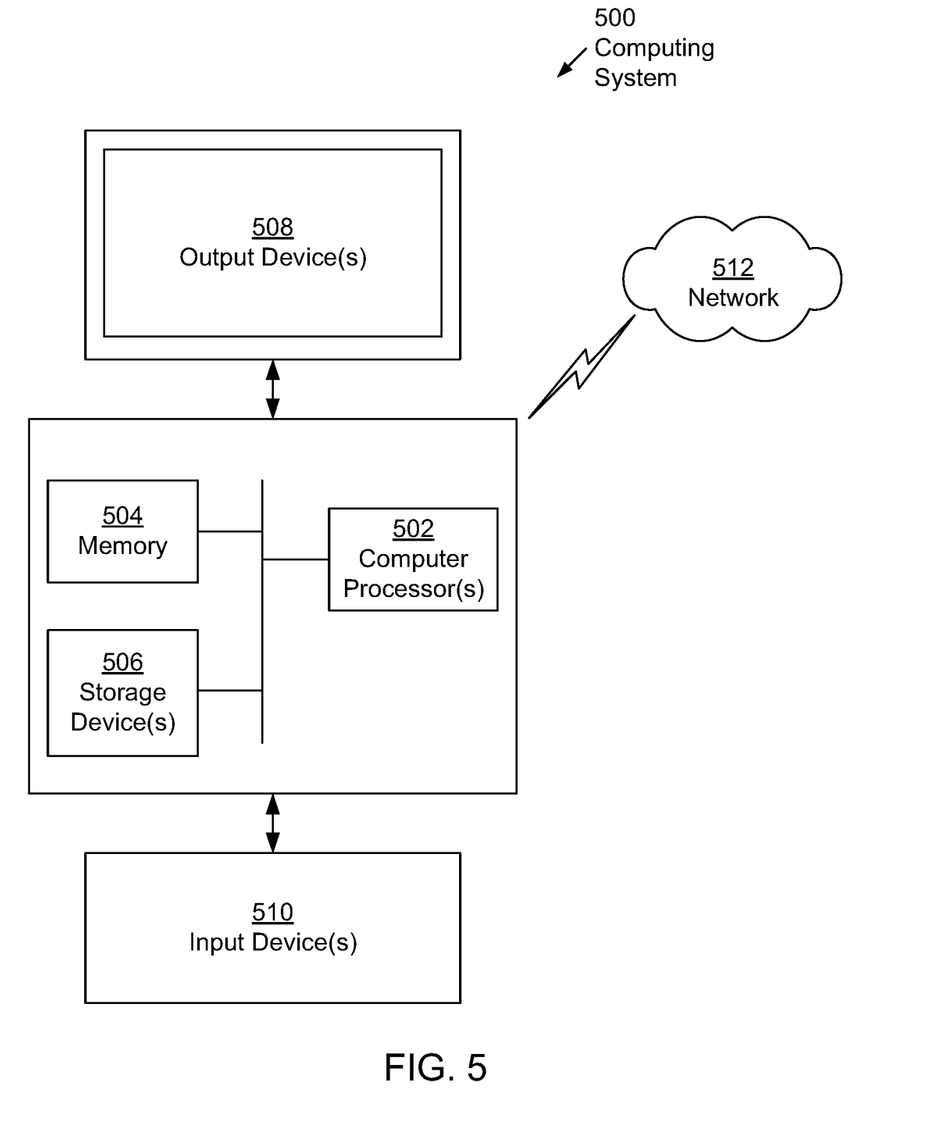
FIG. 5 shows a computing system in accordance with one or more embodiments of the technology.

Embodiments of the technology may be implemented on a computing system. Any combination of mobile, desktop, server, embedded, or other types of hardware may be used. For example, as shown in FIG. 5, the computing system (500) may include one or more computer processor(s) (502), associated memory (504) (e.g., random access memory (RAM), cache memory, flash memory, etc.), one or more storage device(s) (606) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (500) may also include one or more input device(s) (510), such as a touchscreen, keyboard, mouse, microphone, touchpad, electronic pen, or any other type of input device. Further, the computing system (500) may include one or more output device(s) (508), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (500) may be connected to a network (512) (e.g., a local area network (LAN), a wide area network (WAN) such as the Internet, mobile network, or any other type of network) via a network interface connection (not shown). The input and output device(s) may be locally or remotely (e.g., via the network (512)) connected to the computer processor(s) (502), memory (504), and storage device(s) (506). Many different types of computing systems exist, and the aforementioned input and output device(s) may take other forms.

Software instructions in the form of computer readable program code to perform embodiments of the technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code, that when executed by a processor(s), is configured to perform embodiments of the technology.

Further, one or more elements of the aforementioned computing system (500) may be located at a remote location and connected to the other elements over a network (512). Further, embodiments of the technology may be implemented on a distributed system having a plurality of nodes, where each portion of the technology may be located on a different node within the distributed system. In one embodiment of the technology, the node corresponds to a distinct computing device. Alternatively, the node may correspond to a computer processor with associated physical memory. The node may alternatively correspond to a computer processor or micro-core of a computer processor with shared memory and/or resources.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A method for document search in a structured document repository, comprising:
 obtaining, from a client, a request, wherein the request comprises:
  a document search query that specifies document content; and
  a location constraint;
 selecting, in a document search index associated with the structured document repository, a first index entry;
 making a first determination that the document content matches a first index term of the first index entry; and
 making a second determination, based on the first determination, that a first document location of the first index entry does not satisfy the location constraint;
 selecting, based on the second determination, a second index entry in the document search index;
 making a third determination that the document content matches a second index term of the second index entry;
 making a fourth determination, based on the third determination, that a second document location of the second index entry satisfies the location constraint; and
 providing, based on the fourth determination, information associated with the second index entry to the client.

2. The method of claim 1, further comprising, prior to selecting the first index entry:
 adding a document to the structured document repository at the second document location;
 obtaining a plurality of index terms for the document;
 storing the plurality of index terms in the second index entry; and
 storing the second document location in the second index entry.

3. The method of claim 2, wherein providing the information associated with the second index entry to the client comprises reporting the document to the client.

4. The method of claim 2, wherein the plurality of index terms comprises the second index term.

5. The method of claim 2, wherein the information associated with the second index entry is a document identifier associated with the document.

6. The method of claim 1, wherein the location constraint specifies one selected from the group consisting of a folder in a file system and a location in a database.

7. The method of claim 1, wherein the second document location of the second index entry specifies a folder in a hierarchical file system of the structured document repository.

8. A non-transitory computer readable medium comprising instructions which, when executed by a computer processor, enables the computer processor to perform a method for document search in a structured document repository, the method comprising:
   obtaining, from a client, a request, wherein the request comprises:
      a document search query that specifies document content; and
      a location constraint;
   selecting, in a document search index associated with the structured document repository, a first index entry;
   making a first determination that the document content matches a first index term of the first index entry; and
   making a second determination, based on the first determination, that a first document location of the first index entry does not satisfy the location constraint;
   selecting, based on the second determination, a second index entry in the document search index;
   making a third determination that the document content matches a second index term of the second index entry;
   making a fourth determination, based on the third determination, that a second document location of the second index entry satisfies the location constraint; and
   providing, based on the fourth determination, information associated with the second index entry to the client.

9. The non-transitory computer readable medium of claim 8, wherein prior to selecting the first index entry, the method further comprises:
   adding a document to the structured document repository at the second document location;
   obtaining a plurality of index terms for the document;
   storing the plurality of index terms in the second index entry; and
   storing the second document location in the second index entry.

10. The non-transitory computer readable medium of claim 9, wherein providing the information associated with the second index entry document to the client comprises reporting the document to the client.

11. The non-transitory computer readable medium of claim 9, wherein the plurality of index terms comprises the second index term.

12. The non-transitory computer readable medium of claim 9, wherein the information associated with the second index entry is a document identifier associated with the document.

13. The non-transitory computer readable medium of claim 8, wherein the location constraint specifies one selected from the group consisting of a folder in a file system and a location in a database.

14. The non-transitory computer readable medium of claim 8, wherein the second document location of the second index entry specifies a folder in a hierarchical file system of the structured document repository.

15. A system, comprising:
   a storage device, comprising:
      a structured document repository; and
      a document search index; and
   a processor programmed to perform a method comprising:
      obtaining, from a client, a request, wherein the request comprises:
         a document search query that specifies document content; and
         a location constraint;
      selecting, in the document search index associated with the structured document repository, a first index entry;
      making a first determination that the document content matches a first index term of the first index entry; and
      making a second determination, based on the first determination, that a first document location of the first index entry does not satisfy the location constraint;
      selecting, based on the second determination, a second index entry in the document search index;
      making a third determination that the document content matches a second index term of the second index entry;
      making a fourth determination, based on the third determination, that a second document location of the second index entry satisfies the location constraint; and
      providing, based on the fourth determination, information associated with the second index entry to the client.

16. The system of claim 15, wherein the method further comprises:
   prior to selecting the first index entry:
      adding a document to the structured document repository at the second document location;
      obtaining a plurality of index terms for the document;
      storing the plurality of index terms in the second index entry; and
      storing the second document location in the second index entry.

17. The system of claim 15, wherein the location constraint specifies one selected from the group consisting of a folder in a file system and a location in a database.

18. The system of claim 16, wherein providing the information associated with the second index entry to the client comprises reporting the document to the client.

19. The system of claim 15, wherein the second document location of the second index entry specifies a folder in a hierarchical file system of the structured document repository.

20. The system of claim 16, wherein the plurality of index terms comprises the second index term.

* * * * *

UNITED STATES PATENT AND TRADEMARK OFFICE
CERTIFICATE OF CORRECTION

PATENT NO. : 10,713,305 B1
APPLICATION NO. : 15/279892
DATED : July 14, 2020
INVENTOR(S) : Hongtao Dai et al.

Page 1 of 1

It is certified that error appears in the above-identified patent and that said Letters Patent is hereby corrected as shown below:

In the Claims

Column 9, Line 54, in Claim 10, the phrase "second index entry document to the client" should read -- second index entry to the client --.

Signed and Sealed this
Twenty-ninth Day of September, 2020

Andrei Iancu
*Director of the United States Patent and Trademark Office*